United States Patent
Freeman et al.

(10) Patent No.: US 6,510,528 B1
(45) Date of Patent: Jan. 21, 2003

(54) METHOD FOR IMPROVING PERSONAL COMPUTER RELIABILITY FOR SYSTEMS THAT USE CERTAIN POWER SAVING SCHEMES

(75) Inventors: Joseph Wayne Freeman, Raleigh, NC (US); Isaac Karpel, Cary, NC (US); Randall Scott Springfield, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/464,462

(22) Filed: Dec. 14, 1999

(51) Int. Cl.[7] ................................. G06F 11/08
(52) U.S. Cl. .................... 714/6; 714/54; 714/764; 713/324
(58) Field of Search ................ 714/6, 54, 55, 714/24, 763, 764; 713/320, 323, 324, 340; 365/226, 227, 228

(56) References Cited

U.S. PATENT DOCUMENTS

| | | | |
|---|---|---|---|
| 4,479,214 A | * 10/1984 | Ryan | 365/200 |
| 5,077,737 A | 12/1991 | Leger et al. | 371/10.1 |
| 5,263,032 A | 11/1993 | Porter et al. | 371/40.2 |
| 5,495,491 A | * 2/1996 | Snowden et al. | 714/764 |
| 5,588,112 A | 12/1996 | Dearth et al. | 395/182.07 |
| 5,692,121 A | 11/1997 | Bozso et al. | 395/182.11 |
| 5,867,718 A | 2/1999 | Intrater et al. | 395/750.05 |
| 5,902,352 A | * 5/1999 | Chou et al. | 709/100 |
| 5,937,200 A | 8/1999 | Frid et al. | 395/737 |
| 5,978,952 A | * 11/1999 | Hayek et al. | 714/764 |
| 6,016,549 A | * 1/2000 | Matsushiba et al. | 710/8 |
| 6,065,123 A | * 5/2000 | Chou et al. | 709/103 |
| 6,119,248 A | * 9/2000 | Merkin | 714/52 |
| 6,292,869 B1 | * 9/2001 | Gerchman et al. | 365/222 |
| 6,405,320 B1 | * 6/2002 | Lee et al. | 327/276 |

* cited by examiner

*Primary Examiner*—Scott Baderman
(74) *Attorney, Agent, or Firm*—Bracewell & Patterson LLP

(57) ABSTRACT

A periodic system "wake-up" is implemented during S1, S2 or S3 states utilizing a hardware timer. A memory scrubbing routine is initiated that reads out all memory locations and writes back any memory locations that have single bit (correctable) Error Correction Code errors. This procedure minimizes the chances of a multiple bit error build up over time that may cause an unrecoverable error. The scrubbing routine is invoked whenever the system is brought out of S1, S2, or S3 state to insure that there are no single bit errors present when full system operation is resumed.

15 Claims, 2 Drawing Sheets

METHOD FOR IMPROVING PERSONAL COMPUTER RELIABILITY FOR SYSTEMS THAT USE CERTAIN POWER SAVING SCHEMES

BACKGROUND OF THE INVENTION

1. Technical Field

The present invention relates in general to data processing systems and in particular to the data processing (computer) memory system. Still more particularly, the present invention relates to providing an error correction scheme to the memory system.

2. Description of the Related Art

It was discovered in the mid 1970's that random, unpredictable memory errors were caused by ionization trails left by the passage of "alpha particles." Many improvements were made in materials technology that reduced the problem to an acceptable level. As the density of memory technology improved, by several orders of magnitude, size of the component parts decreased as well and susceptibility to alpha particles and other subatomic particles increased.

The computer industry responded to this problem by incorporating a technique known as Error Correction Code (ECC). ECC corrects single bit errors in a memory location and detects multiple bit errors. Another technique used in conjunction with ECC is "scrubbing." Scrubbing is basically the act of writing corrected data back to the memory location that experienced a single bit error. Scrubbing can be implemented either with hardware that automatically writes back to a memory location a corrected bit error or with software that reads and then writes a block of data when notified of one or more single bit errors. The whole point of scrubbing is to minimize single bit errors in memory (that can be handled by ECC correction) so that a memory location is not at risk of having multiple bit errors accumulate that would cause an unrecoverable error. As long as the system is running and frequently accessing memory, these techniques have been proven to work quite well.

In an effort to minimize power consumption while still providing rapid access to computer functions for users, a number of power saving initiatives have been launched in recent years in the personal computer industry. One of these initiatives that has been widely adopted is a standard know as Advanced Configuration and Power Interface (ACPI). This standard defines several states ranging from high power, high speed operation (S0 state) to total power off (S5 state). S0 is the normal running state and the Personal Computer (PC) can consume more than 50 watts of power; at S1 the CPU stop clock is switched off which reduces power consumption to around 30 watts; at S2, the CPU is switched off; at S3, the PC is in a suspend to RAM state, consuming less than 5 watts; S4 is a suspend to disk state or "Soft Off" and zero watts of power are consumed; S5 is the "Off" state. Of interest to this invention is power states S1, S2, and S3.

In S3 state, the central processor unit, core chipset (memory controller and Input/output controller) and all peripheral devices (such as disk drives and monitors) are shut down—drawing no power. The only thing active in the system are the memory chips that are in a low power self refresh state intended to preserve the contents of memory to allow a rapid response of computer usage when the user performs some overt action such as a keyboard input or mouse movement. In S2 state the processor is powered down and in S1 state, the processor still has power but is halted.

In the above states the ECC hardware and Scrubbing functions that tend to prevent fatal multiple errors are ineffective (data is not being fetched from memory to allow ECC function) while the fundamental causes (sub-atomic particles) of many of these errors proceed at their natural pace.

It would be desirable, therefore, to provide a method and apparatus that will enable a data processing system to minimize single bit errors in memory so as to prevent accumulation of multiple bit errors that will cause an unrecoverable error.

SUMMARY OF THE INVENTION

It is therefore one object of the present invention to provide a method and apparatus for changing state in a data processing system from S1, S2, or S3 state to S0 state.

It is another object of the present invention to provide a method and apparatus to initiate a memory scrubbing routine after the state of the data processing system has been changed from S1, S2, or S3.

It is yet another object of the present invention to provide a method and apparatus for detecting and correcting correctable memory errors.

The foregoing objects are achieved as is now described. A periodic system "wake-up" scheme is implemented during S1, S2 or S3 states utilizing a hardware timer or implemented when the system is brought out of S1, S2 or S3 states. A memory scrubbing routine is initiated that reads out all memory locations and writes back any memory locations that have single bit (correctable) ECC errors. This procedure minimizes the chances of a multiple bit error build up over time that may cause an unrecoverable error. The scrubbing routine is invoked whenever the system is brought out of S1, S2, or S3 state to insure that there are no single bit errors present when full system operation is resumed.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
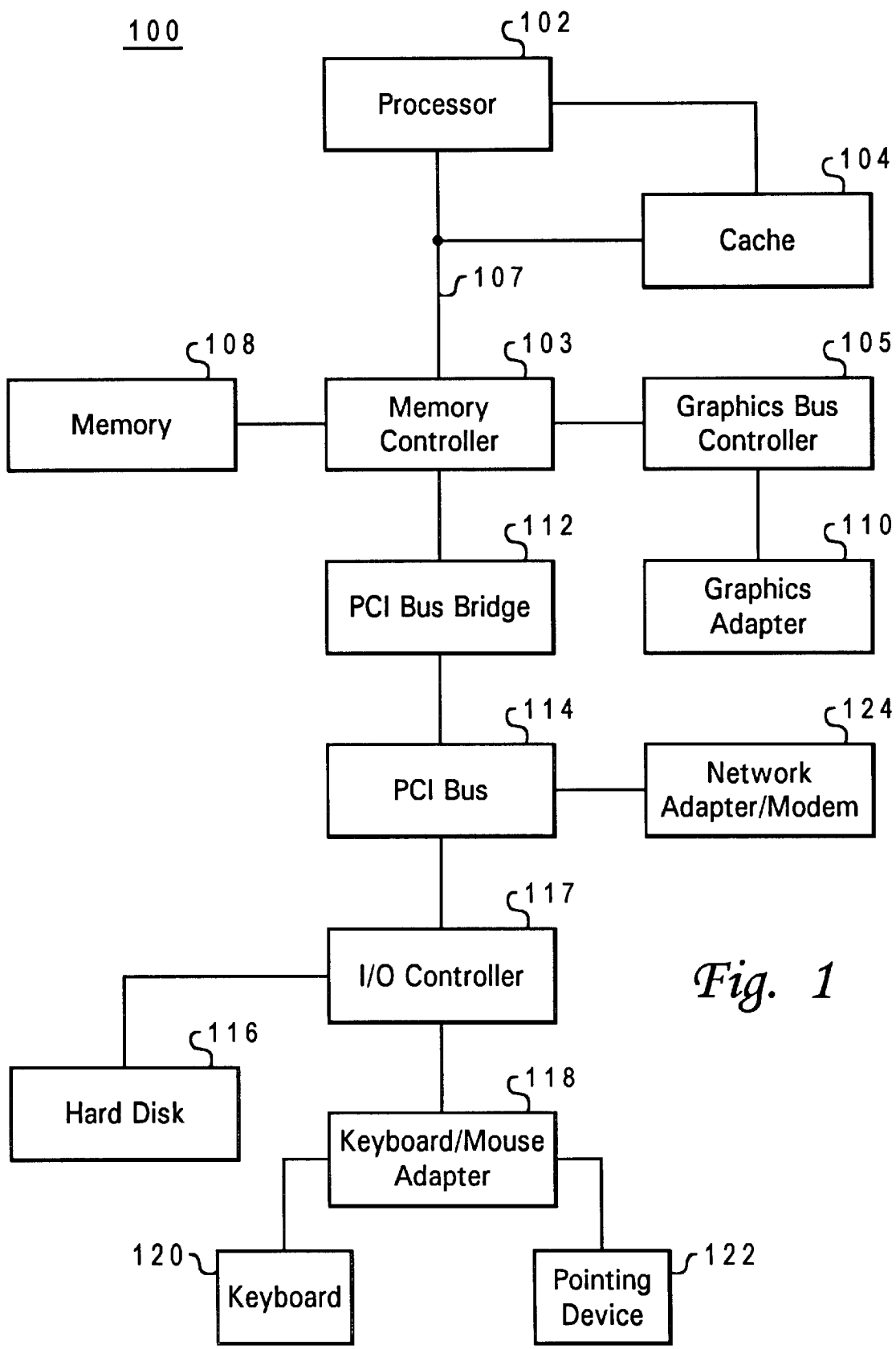
FIG. 1 depicts a high-level block diagram of a data processing system in which a preferred embodiment of the present invention may be implemented.

With reference now to the figures, and in particular with reference to FIG. 1, a high-level block diagram of a data processing system in which a preferred embodiment of the present invention may be implemented, is depicted. Data processing system 100 in the exemplary embodiment includes a processor 102, which may be a PowerPC™ processor available from International Business Machines Corporation of Armonk, N.Y. (or other processors common to the industry). Processor 102 is connected to processor bus 107 and cache 104, which is utilized to stage data to and from processor 102 at reduced access latency. Cache 104 is connected, in turn, to processor bus 107. The processor can access data from cache 104 or system memory 108 by way of a memory controller function 103. Memory controller 103 contains the ECC function. Connected to memory controller 103 is memory-mapped graphics adapter 110 by way of graphic bus controller 105. Graphics adapter 110 provides a connection for a display device (not shown) on which the user interface of software executed within data processing system 100 is displayed.

Also connected to memory controller 103 is PCI bus bridge 112, which provides an interface to PCI bus 114. Connected to PCI bus 114 is I/O controller 117. Attached to I/O controller 117 is keyboard/mouse adapter 118, which provides connection to PCI bus 114 for keyboard 120 and pointing device 122. Pointing device 122 may be a mouse, trackball, or the like. Hard disk controller 116 is also connected to I/O controller 117 and controller 116 provides access to hard disk 116 (non-volatile memory). Network adapter 124 can be attached, utilizing PCI bus 114, for connecting data processing system 100 to a local area network (LAN), the Internet, or both. Those skilled in the art will appreciate that other devices may be incorporated into data processing system 100, such as an optical disk drive or a modem.

Figure 2:
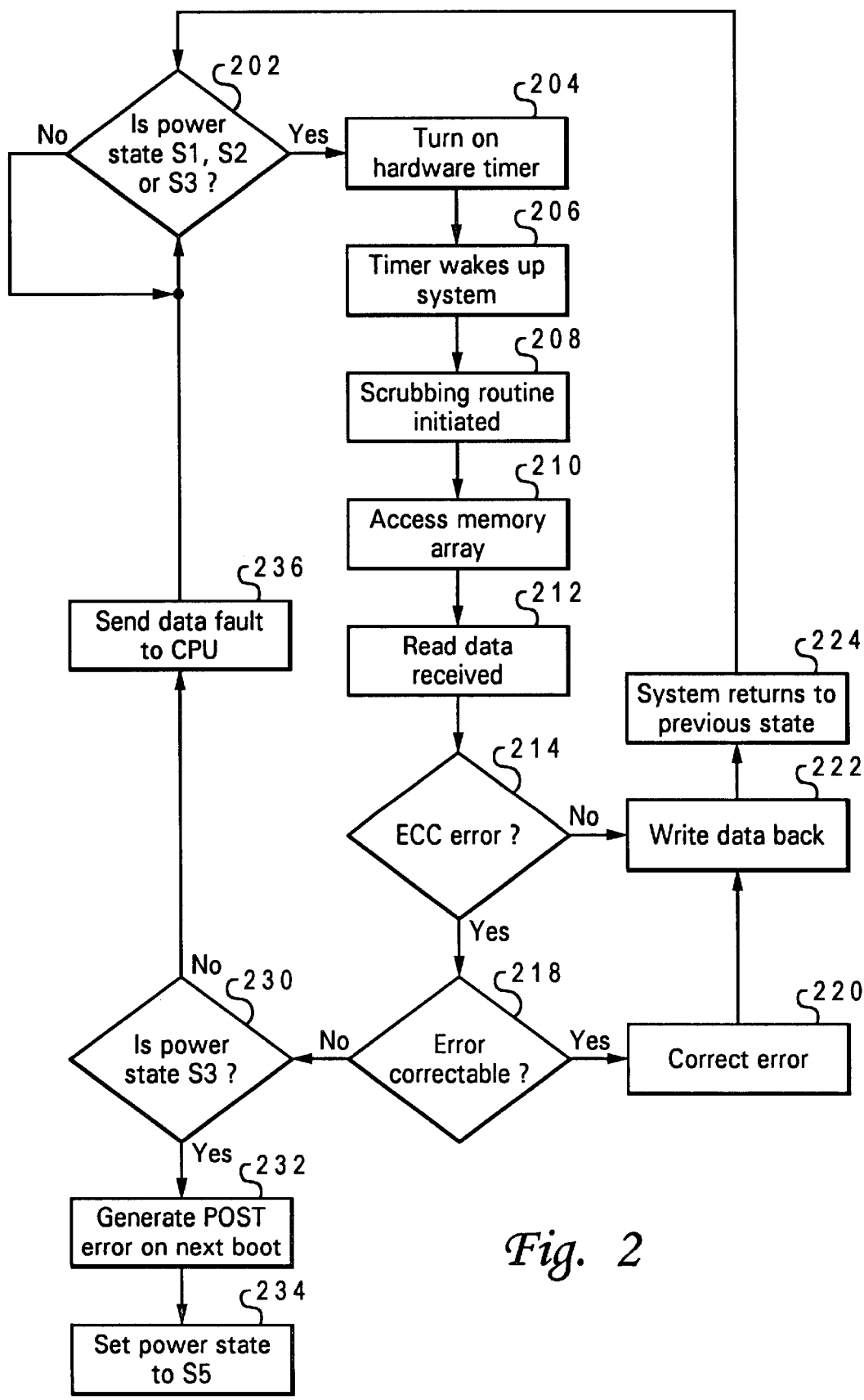
FIG. 2 is a high-level flow diagram of a method for improving reliability in a memory system, that uses power saving schemes, in accordance with a preferred embodiment of the present invention.

Referring to FIG. 2, a high-level flow diagram of a method for improving reliability in a memory system, that uses power saving schemes, in accordance with a preferred embodiment of the present invention, is illustrated. The process begins with step 202, which depicts a determination of whether the power state of the data processing system is S1, S2, or S3. If the determination is made that the power state is neither S1, S2, or S3, the process returns to step 202 and repeats. If the determination is made that the data processing system is in S1, S2, or S3; the process passes to step 204, which illustrates control logic turning on a hardware timer. The process next, proceeds to step 206, which depicts the hardware time "waking up" the data processing system.

The process then passes to step 208, which illustrates initiation of a scrubbing routine for memory. As the scrubbing routine begins, the process moves to step 210, which depicts the system accessing memory. Next, the process proceeds to step 212, which illustrates reading data from memory. The process continues to step 214, which depicts a determination of whether there is an ECC error present in the data read from memory. If there are no errors, the process passes to step 222, which illustrates writing the inspected data back to memory. The process then passes to step 224, which depicts the system returning to the state prior to system wake up. The process then continues to step 202.

Returning to step 214, if the determination is made that there is(are) ECC error(s), the process instead moves to step 218, which illustrates a determination of whether the error(s) detected are correctable. If the errors are determined to be un-correctable, the process passes to step 230, which illustrates a determination of whether the power state is S3. If the determination is made that the power state is not in an S3 state, then the system is in S1 or S2 state and the process passes to step 236, which depicts sending a data fault to the CPU. The process then continues to step 202.

Returning to step 230, if it is determined that the system is in S3, the process instead passes to step 232, which depicts generating a POST (Power on self-test) error, that is an error is reported when the system is powered up again. The system is then set to S5 state.

Returning to step 218, if it is determined that the error is correctable, the process instead passes to step 220, which depicts the system correcting the discovered error. The process then proceeds to step 222, which depicts writing the corrected data back to the memory. The process then passes to step 224, which illustrates the system returning to the state prior to system wake up. The process may also be run during system operation in higher level states without going through the wake up procedure.

The process allows for ECC error checking when the system is in S1, S2 or S3 states. It does so by utilizing a timer to wake up the system and run a memory scrubbing routine. Additionally, if at least a double bit ECC error (more than a single bit error, which is correctable) is detected during S2, S2 or S3 states, the process shuts down the system after setting up a POST error that will display on the next boot. Also, the process may be run during S0 state without going through the wake up procedure.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for scrubbing data in a memory in a data processing system, said method comprising:
   determining if the data processing system is in a lower power state;
   in response to said determination of said lower power state, starting a timer to prompt a changing of said lower power state to a higher power state;
   upon the data processing system changing from said lower power state to said higher power state, checking data in the memory for an error; and
   correcting said error in the memory.

2. The method of claim 1, further comprising:
   subsequent to said checking data in the memory for said error, returning said power from said higher power state to said lower power state.

3. The method of claim 1, further comprising:
   determining if said error can be corrected; and
   upon a determination that said error is uncorrectable, generating a signal indicating that said error is uncorrectable.

4. The method of claim 3, wherein if said lower power state is in an Advanced Configuration and Power Interface (ACPI) S3 state, then said signal indicating said error is a Power On Self-Test (POST) error that is generated when said data processing system is repowered up after being turned off.

5. The method of claim 3, wherein if said lower power state is an Advanced Configuration and Power Interface (ACPI) S1 or S2 state, then said signal indicating said error is a data fault sent to a processor in said data processing system.

6. A data processing system capable of scrubbing data in a memory, said data processing system comprising:

means for determining if the data processing system is in a lower power state;

means for, responsive to said determination of said lower state, starting a timer to prompt a changing of said lower power state to a higher power state;

means for, upon the data processing system changing from said lower power state to said higher power state, checking data in the memory for an error; and a means for correcting said error in the memory.

7. The data processing system of claim 6, further comprising:

means for, subsequent to said checking the memory for said error, returning said power from said higher power state to said lower power state.

8. The data processing system of claim 6, further comprising:

means for determining if said error can be corrected; and means for, upon a determination that said error is uncorrectable, generating a signal indicating that said error is uncorrectable.

9. The data processing system of claim 8, wherein if said lower power state is in an Advanced Configuration and Power Interface (ACPI) S3 state, then said signal indicating said error is a Power On Self-Test (POST) error that is generated when said data processing system is re-powered up after being turned off.

10. The data processing system of claim 8, wherein if said lower power state is an Advanced Configuration and Power Interface (ACPI) S1 or S2 state, then said signal indicating said error is a data fault sent to a processor in said data processing system.

11. A computer program product within a computer usable medium for scrubbing data in a memory in a data processing system, said computer program product comprising:

instructions for determining if the data processing system is in a lower power state;

instructions for, in response to said determination of said lower power state, starting a timer to prompt a changing of said lower power state to a higher power state;

instructions for, upon the data processing system changing from said lower power state to said higher power state, checking data in the memory for an error; and instructions for correcting said error in the memory.

12. The computer program product of claim 11, further comprising:

instructions for, subsequent to said checking the memory for said error, returning said power to said lower power state.

13. The computer program product of claim 11, fiber comprising:

instructions for determining if said error can be corrected; and instructions for, upon a determination that said error is uncorrectable, generating a signal indicating that said error is uncorrectable.

14. The computer program product of claim 13, wherein if said lower power state is in an Advanced Configuration and Power Interface (ACPI) S3 state, then said signal indicating said error is a Power On Self-Test (POST) error that is generated when said data processing system is re-powered up after being turned off.

15. The computer program product of claim 13, wherein if said lower power state is an Advanced Configuration and Power Interface (ACPI) S1 or S2 state, then said signal indicating said error is a data fault sent to a processor in said data processing system.

* * * * *